S. R. WARNER.
Corn Planter.
No. 30,779.
Patented Nov. 27, 1860.
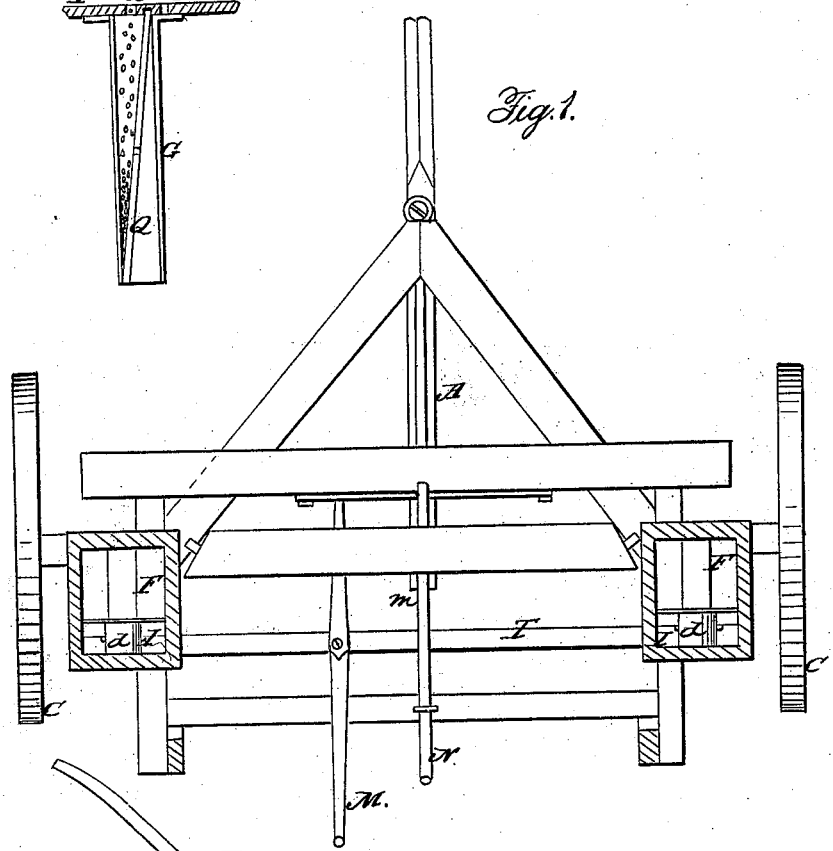

UNITED STATES PATENT OFFICE.

SMITH R. WARNER, OF LONDON, OHIO.

IMPROVEMENT IN SEEDING-MACHINES.

Specification forming part of Letters Patent No. 30,779, dated November 27, 1860.

*To all whom it may concern:*

Be it known that I, SMITH R. WARNER, of London, in the county of Madison and State of Ohio, have invented certain new and useful Improvements in Corn-Planters; and I do hereby declare that the following is a full, clear, and exact description of the same, reference being had to the accompanying drawings, and to the letters of reference marked thereon.

The nature of my invention consists in constructing and arranging the several parts of this machine in the manner hereinafter described.

In the annexed drawings, Figure 1 represents a plan view of the machine. Fig. 2 represents a longitudinal vertical section. Fig. 3 is a section of the discharge spout and valve.

In the figures, A represents a substantial frame, which is supported upon the axle D and the wheels C C. Upon the top of the frame A is secured a frame, B, said frame B being secured to A by a hinge at x, as seen in Fig. 2. To the frame B are secured the seed boxes or hoppers F F. These boxes are stationed at a proper distance apart for dropping two rows of corn at a time.

I I represent seed-slides, which enter the seed-boxes F F and serve to convey out the proper quantity of corn, being provided with suitable apertures, a a, which receive the corn, as seen in Fig. 3. These slides are connected together by a rod, T, and are operated backward and forward longitudinally by means of the lever M, which is worked by the hand of the operator.

N represents a lever, which is secured to the frame B, and which has its fulcrum upon a standard, m, which is erected on the frame A. This lever N is for the purpose of raising and lowering the frame B, when desirable.

G is the discharge-spout, one of said spouts being placed under each box for conveying the grain to the ground. Within the spout G is secured a valve, Q, said valve being connected at its top to the seed-slide, as seen, and being also pivoted to the spout about midway by means of a pin, i. When the slide brings the corn to the spout for deposit the valve is in the position seen in Fig. 3, and the grain, dropping down, is caught between the valve and the spout near the ground and held there until the slides moves back. The grain thus held is discharged and a fresh supply is received upon the other side of the valve in the same manner and is again discharged, as described.

d d represent cut-offs in the seed-boxes, and S S are plows for opening a furrow for the grain and for covering the same when in the ground.

Having thus fully described my invention, what I claim as new, and desire to secure by Letters Patent, is—

The arrangement of the frames A and B, the one hinged upon top of the other, the seed-boxes F, the seed-slides I, the discharge-spouts G, the valves Q, levers M and P, and the plows S S, the several parts being constructed and arranged as and for the purposes specified.

SMITH R. WARNER.

Attest:
B. H. LEWIS,
JOHN JONES.